(12) United States Patent
Magarill

(10) Patent No.: US 7,390,097 B2
(45) Date of Patent: Jun. 24, 2008

(54) MULTIPLE CHANNEL ILLUMINATION SYSTEM

(75) Inventor: Simon Magarill, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 178 days.

(21) Appl. No.: 10/923,945

(22) Filed: Aug. 23, 2004

(65) Prior Publication Data

US 2006/0039140 A1    Feb. 23, 2006

(51) Int. Cl.
G03B 21/14    (2006.01)
B60Q 1/26    (2006.01)

(52) U.S. Cl. .......................... 353/94; 353/38; 362/235

(58) Field of Classification Search .................. 353/31, 353/20, 30, 33, 34, 37, 99, 102, 94, 38; 362/227, 362/231, 235, 800
See application file for complete search history.

(56) References Cited

U.S. PATENT DOCUMENTS

| | | |
|---|---|---|
| 1,428,662 A | 9/1922 | Walter |
| 1,451,893 A | 4/1923 | Walter |
| 1,900,966 A | 3/1933 | Wolfe |
| 1,932,817 A | 10/1933 | Gehrke |
| 2,587,956 A | 3/1952 | Roy |
| 3,756,688 A | 9/1973 | Hudson et al. |
| 3,984,178 A | 10/1976 | Bergqvist |
| 4,025,777 A | 5/1977 | Hayakawa |
| 4,733,335 A | 3/1988 | Serizawa et al. |
| 4,767,172 A | 8/1988 | Nichols et al. |
| 4,852,980 A | 8/1989 | Shinichi |
| 4,915,489 A | 4/1990 | Minko |
| 4,941,072 A | 7/1990 | Yasumoto et al. |
| 5,001,609 A | 3/1991 | Gardner et al. |
| 5,055,892 A | 10/1991 | Gardner et al. |
| 5,285,318 A | 2/1994 | Gleckman |
| 5,398,086 A | 3/1995 | Nakano |
| 5,428,365 A | 6/1995 | Harris |
| 5,442,414 A | 8/1995 | Janssen |
| 5,506,929 A | 4/1996 | Tai et al. |

(Continued)

FOREIGN PATENT DOCUMENTS

EP    0 083 527    7/1983

(Continued)

OTHER PUBLICATIONS

Light Emitting Diodes 2003, Oct. 15-17, 2002, "Optical Design for LED Based Devices" Juan Manuel Teijido, Sony International (Europe) GmbH, Sony Corporate Laboratories Europe.

(Continued)

Primary Examiner—William C. Dowling
(74) Attorney, Agent, or Firm—Jay R. Pralle

(57) ABSTRACT

An illumination system, used for illuminating a target area, includes a plurality of light generating elements and a plurality of light collection units disposed to collect light from respective light generating elements. Imaging lens units are disposed to relay images of respective light collection units to the target area, light from different light generating elements overlapping at the target area. In some embodiments, the illumination system also includes color combining elements to combine light from differently colored light generating elements. The illumination system may be used in a projection system, with the light from the illumination system incident on an image-forming device placed at the target area.

13 Claims, 6 Drawing Sheets

U.S. PATENT DOCUMENTS

| | | |
|---|---|---|
| 5,557,353 A | 9/1996 | Stahl |
| 5,592,188 A | 1/1997 | Doherty |
| 5,625,738 A | 4/1997 | Magarill |
| 5,633,737 A | 5/1997 | Tanaka |
| 5,662,401 A | 9/1997 | Shimizu |
| 5,719,706 A | 2/1998 | Masumoto |
| 5,757,341 A | 5/1998 | Clarke |
| 5,764,319 A | 6/1998 | Nishihara |
| 5,782,553 A | 7/1998 | McDermott |
| 5,796,526 A | 8/1998 | Anderson |
| 5,839,823 A | 11/1998 | Hou |
| 5,863,125 A | 1/1999 | Doany |
| 5,900,981 A | 5/1999 | Oren |
| 5,900,982 A | 5/1999 | Dolgoff |
| 5,902,033 A | 5/1999 | Levis et al. |
| 5,969,872 A | 10/1999 | Oren |
| 5,971,545 A | 10/1999 | Haitz |
| 5,987,793 A | 11/1999 | Ebine |
| 5,997,150 A | 12/1999 | Anderson |
| 6,028,694 A | 2/2000 | Schmidt |
| 6,038,005 A | 3/2000 | Handschy |
| 6,061,183 A | 5/2000 | Nakai |
| 6,102,552 A | 8/2000 | Tullis |
| 6,104,458 A | 8/2000 | Fukuda |
| 6,104,541 A | 8/2000 | Otomo |
| 6,139,156 A | 10/2000 | Okamori et al. |
| 6,144,426 A | 11/2000 | Yamazaki |
| 6,177,761 B1 | 1/2001 | Pelka |
| 6,196,699 B1 | 3/2001 | Stanton |
| 6,201,629 B1 | 3/2001 | McClelland |
| 6,224,216 B1 | 5/2001 | Parker |
| 6,227,669 B1 * | 5/2001 | Tiao et al. ................ 353/31 |
| 6,236,512 B1 | 5/2001 | Nakai |
| 6,252,636 B1 | 6/2001 | Bartlett |
| 6,254,237 B1 | 7/2001 | Booth |
| 6,280,058 B1 | 8/2001 | Horigome |
| 6,318,863 B1 | 11/2001 | Tiao et al. |
| 6,330,039 B2 | 12/2001 | Matsui |
| 6,332,688 B1 | 12/2001 | Magarill |
| 6,336,724 B1 | 1/2002 | Shoui et al. |
| 6,341,867 B1 | 1/2002 | Itoh |
| 6,398,389 B1 | 6/2002 | Bohler et al. |
| 6,402,347 B1 | 6/2002 | Maas |
| 6,412,953 B1 | 7/2002 | Tiao et al. |
| 6,419,365 B1 | 7/2002 | Potekev et al. |
| 6,459,835 B1 | 10/2002 | Nagaoka et al. |
| 6,469,755 B1 | 10/2002 | Adachi |
| 6,471,358 B1 | 10/2002 | Itoh et al. |
| 6,478,453 B2 | 11/2002 | Lammers et al. |
| 6,483,196 B1 | 11/2002 | Wojnarowski |
| 6,491,443 B1 | 12/2002 | Serizawa |
| 6,499,863 B2 | 12/2002 | Dewald |
| 6,505,939 B1 | 1/2003 | Bierhuizen et al. |
| 6,527,419 B1 | 3/2003 | Galli |
| 6,547,400 B1 | 4/2003 | Yokoyama |
| 6,547,423 B2 | 4/2003 | Marshall |
| 6,561,654 B2 | 5/2003 | Mukawa et al. |
| 6,570,190 B2 | 5/2003 | Krames |
| 6,591,037 B2 | 7/2003 | Yonekubo |
| 6,595,648 B1 | 7/2003 | Woodgate et al. |
| 6,623,122 B1 | 9/2003 | Yamazaki et al. |
| 6,639,572 B1 | 10/2003 | Little |
| 6,644,814 B2 | 11/2003 | Ogawa |
| 6,646,806 B1 | 11/2003 | Bierhuizen |
| 6,657,236 B1 | 12/2003 | Thibeault |
| 6,672,724 B1 | 1/2004 | Peterson et al. |
| 6,688,747 B2 | 2/2004 | Wichner et al. |
| 6,698,893 B2 | 3/2004 | Takimoto et al. |
| 6,726,329 B2 | 4/2004 | Li et al. |
| 6,733,139 B2 | 5/2004 | Childers et al. |
| 6,788,471 B2 | 9/2004 | Wagner |
| 6,834,963 B2 | 12/2004 | Kim et al. |
| 6,843,566 B2 | 1/2005 | Mihara |
| 7,029,130 B2 | 4/2006 | Cannon et al. |
| 7,052,138 B2 * | 5/2006 | Matsui ................ 353/31 |
| 7,101,050 B2 | 9/2006 | Magarill et al. |
| 7,163,327 B2 | 1/2007 | Henson et al. |
| 2001/0022613 A1 | 9/2001 | Matsui |
| 2001/0033367 A1 | 10/2001 | Karasawa et al. |
| 2001/0046131 A1 | 11/2001 | Hoelen |
| 2001/0048493 A1 | 12/2001 | Swanson |
| 2001/0048560 A1 * | 12/2001 | Sugano ................ 359/618 |
| 2002/0003636 A1 | 1/2002 | Conner |
| 2002/0003669 A1 | 1/2002 | Kedar et al. |
| 2002/0030194 A1 | 3/2002 | Camras et al. |
| 2002/0060910 A1 | 5/2002 | Knight |
| 2002/0093743 A1 | 7/2002 | Miyamae |
| 2002/0097000 A1 | 7/2002 | Muthu |
| 2002/0105807 A1 | 8/2002 | Loughrey |
| 2002/0114157 A1 | 8/2002 | Fu-Ming et al. |
| 2002/0145708 A1 | 10/2002 | Childers et al. |
| 2002/0154277 A1 | 10/2002 | Mukawa et al. |
| 2002/0159036 A1 * | 10/2002 | Yamagishi et al. ........... 353/31 |
| 2002/0186350 A1 | 12/2002 | Peterson |
| 2002/0191395 A1 | 12/2002 | Fleury |
| 2003/0016539 A1 | 1/2003 | Minano |
| 2003/0043582 A1 | 3/2003 | Chan |
| 2003/0133080 A1 | 7/2003 | Ogawa |
| 2003/0147055 A1 | 8/2003 | Yokoyama |
| 2003/0193649 A1 | 10/2003 | Seki |
| 2003/0214815 A1 | 11/2003 | Ishida et al. |
| 2004/0004176 A1 | 1/2004 | Liang |
| 2004/0042212 A1 | 3/2004 | Du et al. |
| 2004/0062044 A1 | 4/2004 | Kazunari |
| 2004/0062045 A1 | 4/2004 | Chang |
| 2004/0066651 A1 * | 4/2004 | Harumoto ................ 362/231 |
| 2004/0080938 A1 | 4/2004 | Holman et al. |
| 2004/0114250 A1 * | 6/2004 | Kato ................ 359/626 |
| 2004/0174501 A1 | 9/2004 | Slobodin et al. |
| 2004/0202007 A1 | 10/2004 | Yagi et al. |
| 2004/0207816 A1 | 10/2004 | Manabu et al. |
| 2004/0263500 A1 * | 12/2004 | Sakata ................ 345/204 |
| 2005/0018141 A1 * | 1/2005 | Hosaka ................ 353/31 |
| 2005/0023545 A1 | 2/2005 | Camras et al. |
| 2005/0094401 A1 | 5/2005 | Magarill |
| 2005/0116235 A1 | 6/2005 | Schultz et al. |
| 2005/0134811 A1 | 6/2005 | Magarill |
| 2005/0140270 A1 | 6/2005 | Henson et al. |
| 2005/0174658 A1 | 8/2005 | Long et al. |
| 2005/0174768 A1 | 8/2005 | Conner |
| 2005/0174771 A1 | 8/2005 | Conner |
| 2005/0174775 A1 | 8/2005 | Conner |
| 2005/0179041 A1 | 8/2005 | Harbers et al. |
| 2006/0132725 A1 * | 6/2006 | Terada et al. ................ 353/102 |

FOREIGN PATENT DOCUMENTS

| | | |
|---|---|---|
| EP | 0 322 070 | 6/1989 |
| EP | 0 493 800 | 7/1992 |
| EP | 0 587 371 | 3/1994 |
| EP | 0 740 178 | 10/1996 |
| EP | 0 795 771 | 9/1997 |
| EP | 0 837 350 | 4/1998 |
| EP | 0 881 514 | 12/1998 |
| EP | 1 003 064 | 5/2000 |
| EP | 1 052 856 | 11/2000 |
| EP | 1 347 653 | 9/2003 |
| EP | 1 357 333 A | 10/2003 |
| EP | 1 363 460 | 11/2003 |
| EP | 1 398 659 | 3/2004 |
| GB | 1 195 547 A | 6/1970 |
| JP | 09-018072 | 1/1997 |
| JP | 10-123512 | 5/1998 |
| JP | 11-167064 | 6/1999 |

| | | |
|---|---|---|
| JP | 11-231316 | 8/1999 |
| JP | 2000-305040 | 11/2000 |
| JP | 2002-133932 | 5/2002 |
| JP | 2002-177218 A | 6/2002 |
| JP | 2002-184206 | 6/2002 |
| JP | 2003-330109 | 11/2003 |
| JP | 2005-128236 | 5/2005 |
| TW | 531 662 B | 5/2003 |
| WO | WO 95/10731 | 4/1995 |
| WO | WO 02/48775 A | 6/2002 |
| WO | WO 2002/065184 | 8/2002 |
| WO | WO 2003/56876 | 7/2003 |
| WO | WO 2004/043076 | 5/2004 |
| WO | WO 2004/107751 | 12/2004 |
| WO | WO 2004/109366 | 12/2004 |
| WO | WO 2005/078496 | 8/2005 |

OTHER PUBLICATIONS

Jacobson, et al., "Novel Compact Non-Imaging Collectors for LED Arrays", Illumitech, Inc., bjacobson@illumitech.com.

Secondary Optics Design Considerations for SuperFlux LEDs, application brief AB20-5, Appendix 5A, pp. 5-22.

Steve Paolini, Gerard Harbers, Matthijs Keuper, Lumileds, Light from Silicon Valley, High-Power LED Illuminators in Projection Displays, pp. 1-19.

Gerard Harbers, Wim Timmers, Willem Sillevis-Smitt, LED Backlighting for LCD HDTV, Journal of the SID, Oct. 4, 2002, pp. 347-350.

LumiBright Light Engine, Innovations in Optics, Inc, Woburn, Massachusetts.

Lumileds Lighting, U.S., LLC, "Power Light Source Luxeon™ Emitter", Document # DW25 (Jul. 25, 2003) pp. 1-12.

Smith, Warren J. "Modern Optical Engineering The Design of Optical Systems", McGraw-Hill Third Edition, (2000) pp. 245-247, 470-474.

Stupp, Edward H. and Brennesholtz, Matthew S. "Projection Displays" Modeling Lumen Throughput "Etendue at a flat surface" John Wiley & Sons, Inc. III Series (1999) p. 244-245.

Laikin, Milton, "Lens Design-Third Edition, Revised and Expanded", Table of Contents, pp. 305-312, Marcel Dekker, New York, 2001.

Melles Griot: "Specifying Laser Diode Optics" Online! 2000, 2002 XP002323875, Section "Focusing Lenses For Fiber Optics" Lines 19-23, Figures 3, 4.

* cited by examiner

MULTIPLE CHANNEL ILLUMINATION SYSTEM

FIELD OF THE INVENTION

The invention relates to optical systems, and more particularly to illumination systems used for producing light used in, for example, projection systems.

BACKGROUND

Typical projection systems include a source of light, illumination optics, one or more image-forming devices, projection optics and a projection screen. The illumination optics collect light from one or more light sources and direct that light in a predetermined manner to one or more image-forming devices. The image-forming devices, controlled by an electronically conditioned and processed digital video signal or by other input data, produce images corresponding to the video signal or to that data. Projection optics then magnify the image and project it onto the projection screen. Examples of image-forming devices frequently used in projection systems include digital micro-mirror devices, or digital light processing devices (DLPs), and liquid crystal devices, such as liquid crystal on silicon devices (LCoS) and high temperature poly-silicon liquid crystal devices (HTPS-LCD).

White light sources, such as arc lamps, in conjunction with color-maintaining systems, have historically been the most commonly used light sources for projection display systems. Light emitting diodes (LEDs), however, have recently attracted more consideration as an alternative type of light source. Some advantages of LED light sources include longer lifetime, higher efficiency and superior thermal characteristics.

The illumination optics employed in common projection systems often include integrators. Integrators typically serve to homogenize the light supplied to the image-forming device. Presently known integrators include fly-eye integrators and mirror tunnels, for example, rectangular tunnels, solid or hollow, and elongated tunnels composed of solid glass rods that rely on total internal reflection to transfer light.

SUMMARY OF THE INVENTION

One exemplary embodiment of the invention is directed to an illumination unit for illuminating a target area. The illumination system includes a plurality of light generating elements and a plurality of light collection units disposed to collect light from respective light generating elements. A plurality of imaging lens units is disposed to relay images of respective light collection units to the target area, the images overlapping at the target area.

Another exemplary embodiment of the invention is directed to an illumination unit for illuminating a target area. The system includes a first color sub-assembly, where the first color sub-assembly has a first plurality of light generating elements, a plurality of first light collection units disposed to collect light from respective light generating elements of the first plurality of light generating elements, and a first plurality of imaging units disposed to relay images of respective first light collection units to the target area. A second color sub-assembly has a second plurality of light generating elements, a plurality of second light collection units disposed to collect light from respective light generating elements of the second plurality of light generating elements, and a second plurality of imaging units disposed to relay images of respective second light collection units to the target area. Combining optics are disposed to combine light from the first and second color sub-assemblies before the light from the first and second color sub-assemblies is incident at the target area.

Another exemplary embodiment of the invention is directed to a core unit for a projection engine. The unit includes an image-forming device and a first light generating element. A first lens unit is disposed to collect light emitted by the first light generating element, and a first imaging unit is disposed to image the light from the first lens unit to the image-forming device. The unit also includes a second light generating element, a second lens unit disposed to collect light emitted by the second light generating element, and a second imaging unit disposed to image the light from the second lens unit to the image-forming device.

The above summary is not intended to describe each illustrated embodiment or every implementation of the present disclosure. The following figures and detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
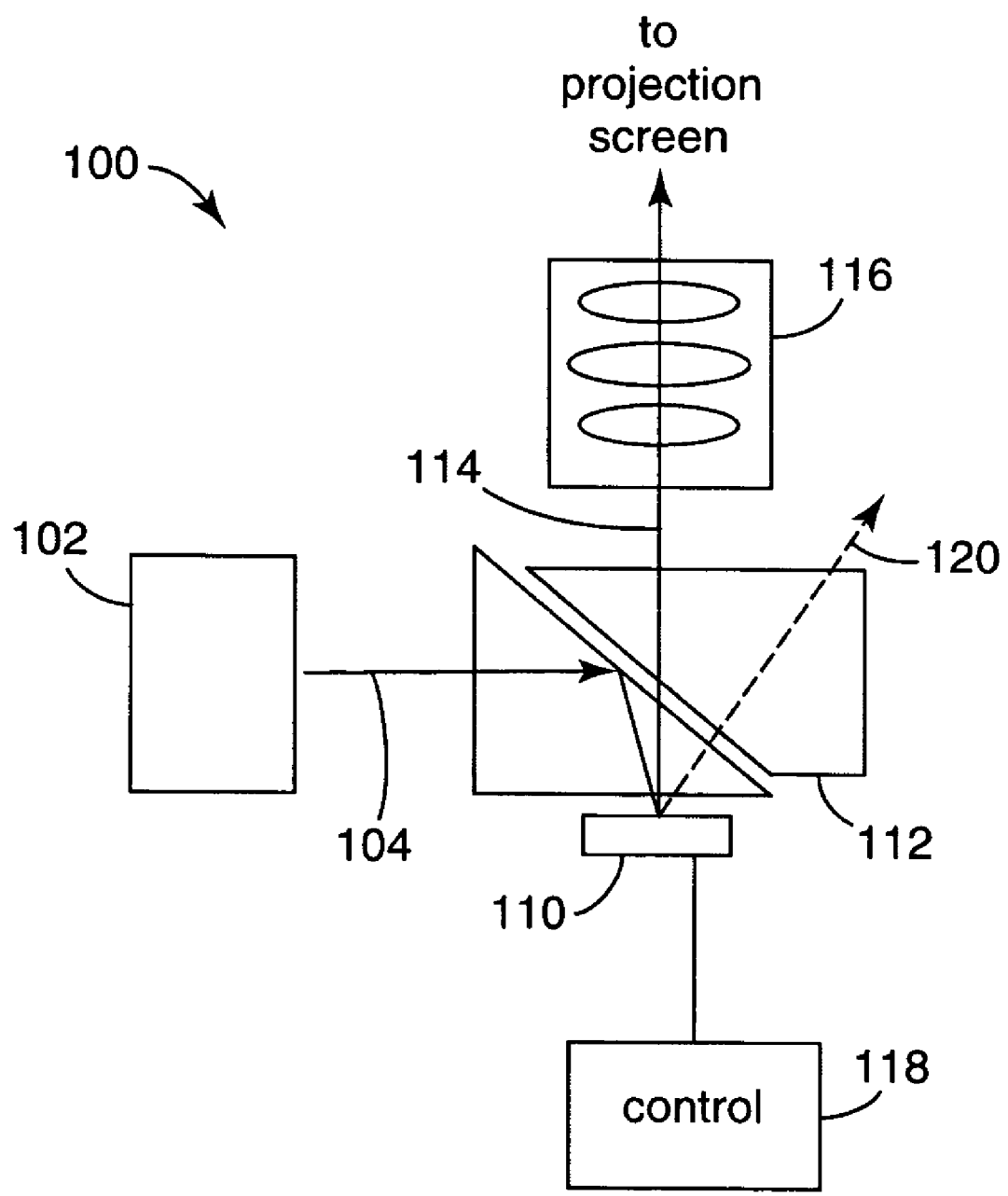
FIG. 1 schematically illustrates an exemplary embodiment of a projection system, based on an image-forming device that uses an array of deflectable mirrors, that uses an illumination system according to the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure as defined by the appended claims.

DETAILED DESCRIPTION

The present disclosure is applicable to optical systems and is more particularly applicable, although not limited, to light collection and management systems useful for illuminating a target. The illumination system of the type described here may be particularly suitable for use with light from one or more light emitting diodes (LEDs) or other lambertian-type light sources.

LEDs with higher output power are becoming more available, which opens up new applications for LED illumination. Some applications that may be addressed with high power LEDs include their use as light sources in projection and display systems, as illumination sources in machine vision systems and camera/video applications, and even in distance illumination systems such as car headlights.

LEDs typically emit light over a wide angle, and one of the challenges for the optical designer is to efficiently collect the light produced by an LED and direct the light to a selected target area. Another challenge is to package the LEDs effectively, which often means collecting light from an assembly having multiple LEDs and directing the collected light to a given target area within a given acceptance cone.

LED-based light sources may be used in many different applications. One application for which illumination systems of the present disclosure may be particularly suitable is the illumination of image-forming devices in projection systems. Such projection systems may be used, for example, in rear projection televisions.

In a projection system, illumination light from one or more light sources is incident on one or more image-forming devices. Image light is reflected from, or transmitted through, the image-forming device, and the image light is usually projected to a screen via a projection lens system. Liquid crystal display (LCD) panels, both transmissive and reflective, are often used as image-forming devices. One particularly common type of LCD panel is the liquid crystal on silicon (LCOS) panel. Another type of image-forming device, sold by Texas Instruments, Plano, Tex., under the brand name DLP™, uses an array of individually addressable mirrors, which either deflect the illumination light towards the projection lens or away from the projection lens. While the following description addresses both LCD and DLP™ type image-forming devices, there is no intention to restrict the scope of the present disclosure to only these two types of image-forming devices and illumination systems of the type described herein may use other types of devices for forming an image that is projected by a projection system.

An illumination system as described herein may be used with single panel projection systems or with multiple panel projection systems. In a single panel projection system, the illumination light is incident on only a single image-forming panel. The incident light is commonly passed through a time-varying color filter, so that light of only one color is incident on image-forming device at any one time. As time progresses, the color of the light transmitted by the filter changes, for example, from red to green to blue and back to red, at which point the cycle repeats. This is often referred to as a "field sequential color" mode of operation.

An exemplary embodiment of a single panel projection system 100 that may use the illumination system described herein is schematically illustrated in FIG. 1. The system 100 operates in the "field sequential color" mode. A light source 102 generates a beam 104 of light. The light source 102 may include one or more light generating elements, such as a lamp or one or more LEDs, and may also include other elements for collecting the light from the light generating elements and for conditioning the light before incidence on the image-forming devices. Beam conditioning elements may include, for example, an integrator to uniformize the intensity profile of the beam 104, one or more elements to control the polarization of the light, for example a prepolarizer and/or a polarization converter, and various refractive and/or reflective elements to convert the divergence, shape and/or size of the light beam 104 to desired values. The light source 102 may be able to switch the color of the light beam 104 incident at the image-forming device. One approach to doing this is to include a sequential color filter, such as a color wheel, in the light source. In other embodiments, the light source may include independently switched light generating elements that generate light of different colors.

In this particular embodiment, the image-forming device 110 is a DLP™ type micromirror array. Although not necessary for an illumination system of the type described herein, the light beam 104 may be passed to the image-forming device 110 via a prism assembly 112 that uses total internal reflection off a prism surface to fold light either entering or leaving the image-forming device. In the illustrated embodiment, the light beam 104 is totally internally reflected within the prism assembly 112 on to the image-forming device 110. The image light beam 114 is directed through the prism assembly 112 to the projection lens unit 116, which projects the image to a screen (not shown).

The image-forming device 110 is coupled to a control unit 118 that controls the image directed to the projection lens unit 116. In the illustrated embodiment, the control unit 118 controls which mirrors of the image-forming device are oriented so as to direct light to the projection lens unit 116 and which mirrors are oriented so as to discard the light as discarded beam 120.

In other types of single panel projection systems, differently colored bands of light may be scrolled across the single panel, so that the panel is illuminated by more than one color at any one time, although any particular point on the panel is instantaneously illuminated with only a single color. Single panel projection systems may use different types of image-forming devices, for example LCoS image-forming devices.

Multiple panel projection systems use two or more image-forming devices or panels. For example, in a three panel system, three differently colored light beams, such as red, green and blue light beams, are incident on three respective image-forming devices or panels. Each panel imposes an image corresponding to the color of the light beam, to produce three differently colored image beams. These image beams are combined into a single, full colored, image beam that is projected to the screen. The illumination light beams may be obtained from a single illumination beam, for example, by splitting a single white illumination beam into red, green and blue beams, or may be obtained by generating separate red, green and blue beams using different sources, for example red, green and blue LEDs.

Figure 2A:
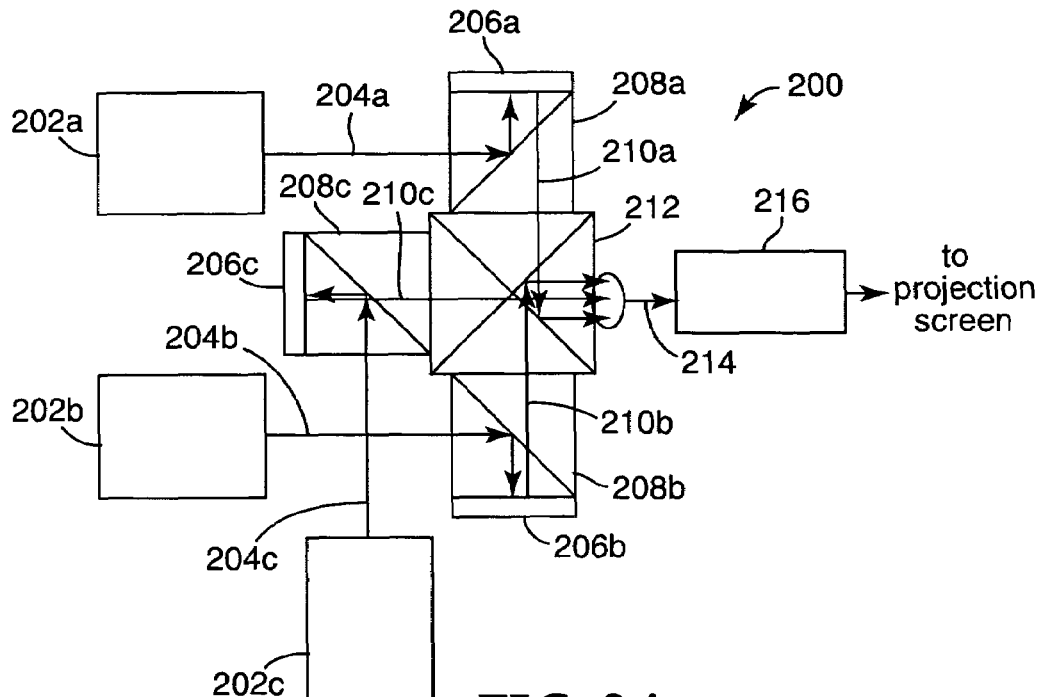
FIGS. 2A and 2B schematically illustrate exemplary embodiments of a projection system, based on image-forming devices that use liquid crystal displays, that use an illumination system according to the present disclosure.

One exemplary embodiment of a multi-panel panel projection system 200 that may incorporate an illumination system as described herein is schematically illustrated in FIG. 2A. The projection system 200 is a three-panel projection system, having three different light sources 202a, 202b and 202c that direct differently colored light beams 204a, 204b and 204c to respective image-forming devices 206a, 206b and 206c. In the illustrated embodiment, the panels 206a, 206b and 206c are LCD-based reflective image-forming devices, and so the light 204a, 204b and 204c is coupled to and from the image-forming devices 206a, 206b and 206c via respective polarizing beamsplitters (PBSs) 208a, 208b and 208c. The image-forming devices 206a, 206b and 206c polarization modulate the incident light 204a, 204b and 204c so that the respective image beams 210a, 210b and 210c are separated by the PBSs 208a, 208b and 208c and pass to the combiner unit 212. In the illustrated exemplary embodiment, the illumination light 204a, 204b and 204c is reflected by the PBSs 208a, 208b and 208c to the image-forming devices and the image light beams 210a, 210b and 210c are transmitted through the PBSs 208a, 208b and 208c. In another approach, not illustrated, the illumination light may be transmitted through the PBSs to the image-forming devices, while the image light is reflected by the PBSs.

In the illustrated exemplary embodiment, the color combiner 212 combines image light 210a, 210b and 210c of different colors, for example using one or more dichroic elements. In particular, the illustrated exemplary embodiment shows an x-cube color combiner, but other types of combiner may be used. The three image beams 210a, 210b and 210c are combined in the color combiner 212 to produce a single, colored image beam 214 that is directed by a projection lens system 216 to a screen (not shown).

Figure 2B:
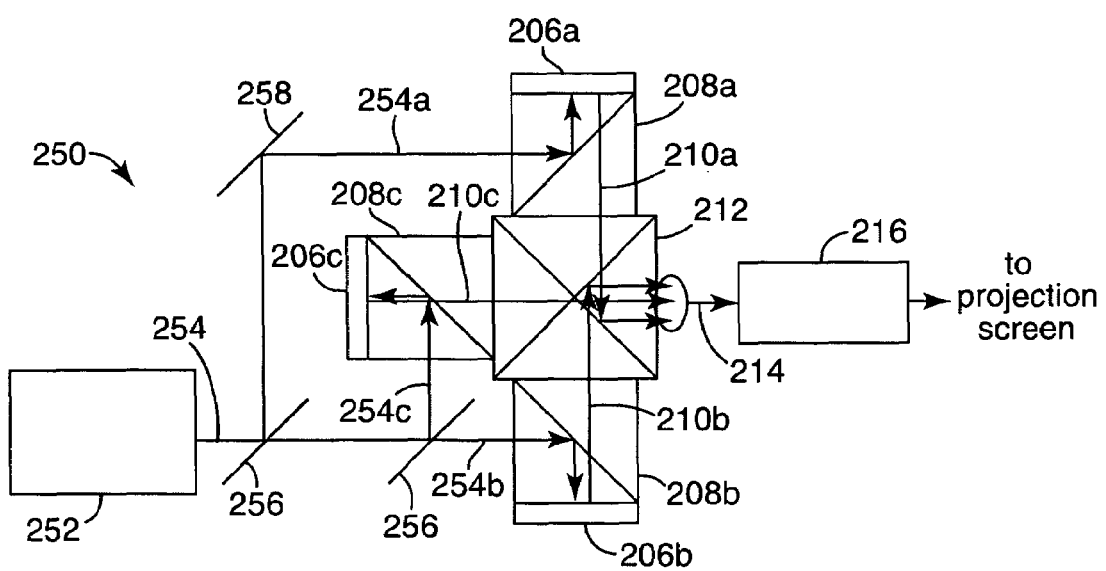

Another exemplary embodiment of a multi-panel projection system 250 that may use an illumination system as described herein, is schematically illustrated in FIG. 2B. According to this embodiment, a light beam 254, containing light in three different color bands, propagates from a light source 252 and is split by color splitting elements 256 for example, dichroic mirrors, into first, second and third beams 254a, 254b and 254c containing light of different colors. The beams 254a, 254b and 254c may be, for example, red, green and blue in color respectively. Beam steering elements 258, for example mirror or prisms, may be used to steer the beams 254, 254a, 254b and 254c.

One design goal of many projection systems is that the illumination light beam has an intensity profile that is relatively uniform across the image-forming device, so that the image as viewed by the user is uniformly bright. Tunnel integrators are commonly used for uniformizing the intensity profile of a light beam generated by a lamp. Other types of light sources have different intensity profiles, however, and it is possible to achieve uniform illumination without using a tunnel integrator. For example, the emission of light from LEDs is somewhat Lambertian in nature, although some commercially available LEDs provide outputs that more closely approximate an ideal Lambertian output than others. One approach to producing an illumination beam from a number of Lambertian, or near-Lambertian, sources is to collect the light from the sources using refractive light collection optics and then to image the output of the light collection optics onto the image-forming device using an imaging lens unit.

Figure 3A:
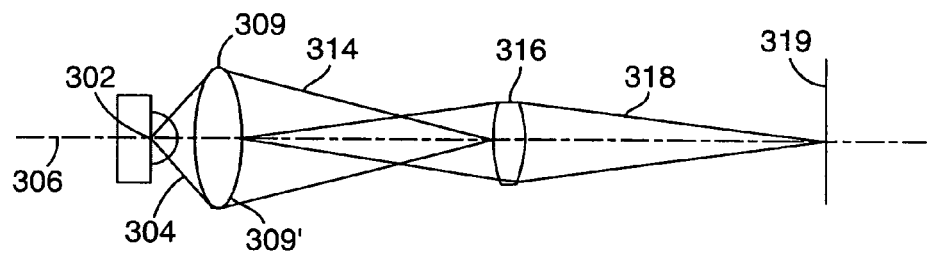
FIG. 3A schematically illustrates exemplary elements of an illumination channel as found in an exemplary illumination system according to principles of the present disclosure.

Some of the illumination units described herein involve parallel combination of light in different illumination channels. Exemplary elements of a single illumination channel are schematically illustrated in FIG. 3A. Light 304 from a light generating element 302 is directed generally along a light source axis 306. It will be appreciated that the statement that light propagates generally along an axis does not restrict the light to propagating only parallel to the axis, but that the light may also be diverging or converging about the axis or in the general direction of the axis.

The light 304 is collected by a light collection unit 309, which may comprise one or more lenses. The collected light 314 is directed to an imaging lens unit 316. An image of the light generating element 302 may be formed at, or close to, the imaging lens unit 316 by the light collection unit 309. The imaging lens unit 316 may also comprise one or more lenses that direct imaged light to a target plane 319. The imaging lens unit 316 is positioned at a distance from the light collection unit 309 so as to form an image of the light collecting element 309 ' closest to the imaging lens unit 316 at, or close to, the target plane 319. The image is said to be proximate the target plane 319. Where the image is formed close to the target plane 319, the image is defocused at the target plane. The permissible degree of such defocusing depends on a particular application. An image-forming device may be positioned at the target plane 319.

Figure 3B:
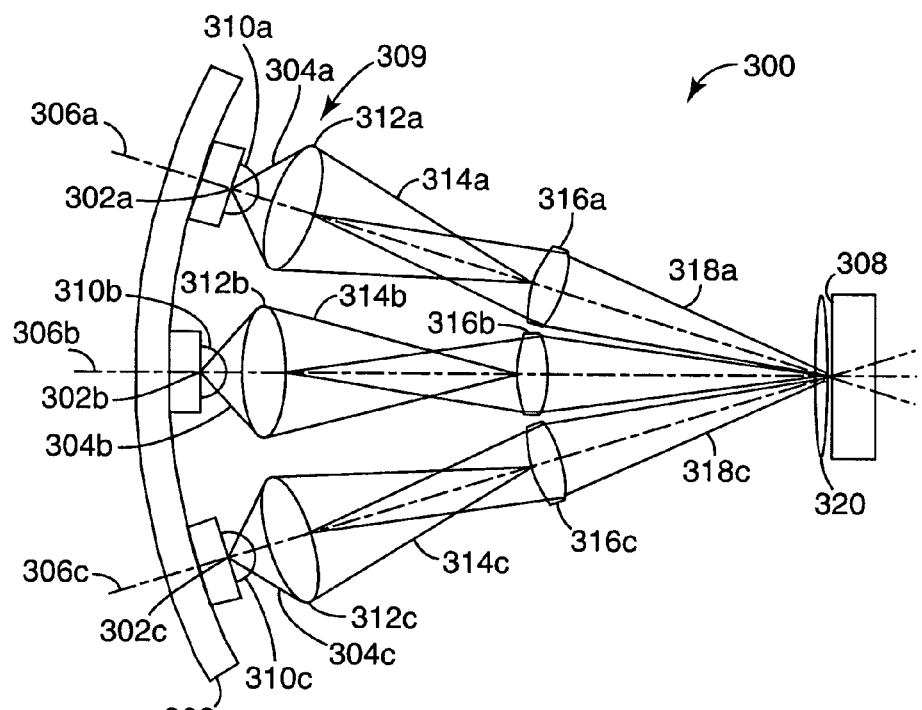
FIG. 3B schematically illustrates an exemplary embodiment of an illumination system according to principles of the present disclosure.

One exemplary embodiment of an illumination unit 300 that uses multiple illumination channels is schematically illustrated in FIG. 3B. In this example, the illumination unit 300 is shown with three light generating elements 302, although different (larger or smaller) numbers of light generating elements 302 may be used. Light generating elements 302a, 302b and 302c are arranged to emit light 304a, 304 b, 304c along respective axes 306a, 306b and 306c towards a target area 308. The light generating elements 302a, 302b and 302c may be mounted to a curved base 303 or they may be mounted individually tangentially to an imaginary curved surface designated as 303. The light generating elements 302a, 302b and 302c may be, for example, LEDs. The axes 306a, 306b and 306c need not be parallel to each other and, in this exemplary embodiment, are preferably directed so as to intersect at the center of the target area 308. The target area 308 corresponds to the location of an image-forming device. There may be further optical elements positioned between the light generating elements 302a, 302b and 302c and the target area 308, in addition to those shown in FIG. 3B, such as beam steering optics and polarizing optics. Such further optical elements are omitted from the drawings for clarity.

Light collection units 309, which in this exemplary embodiment each include one or more lenses, are used to collect the light 304a, 304b, 304c from each light generating element 302a, 302b and 302c. The light generating elements 302a, 302b and 302c may have an associated lens 310a, 310b and 310c. For example, where the light generating elements 302a, 302b and 302c are LEDs, the associated lenses 310a, 310b and 310c may be hemispherical lenses formed of a material encapsulating the LEDs. In the illustrated embodiment, the light collection units 309 include condenser lenses 312a, 312b and 312c. The light generating element 302a has an associated lens 310a and a condenser lens 312a to collect the emitted light 304a. The collected light 314a is directed generally along the axis 306a towards an imaging lens unit 316a. The imaging lens unit 316a is positioned between the target area 308 and the condenser lens 312a so as to relay an image of the condenser lens 312a to proximate the target area 308. The image of the condenser lens 312a may be well-defined or may be somewhat defocused at the target area 308, depending on the desired quality of the illumination at the target area or other parameters, such as the type of the light source or sources, the exemplary system's configuration, size and/or cost. An image of the light generating element 302a may also be formed at the imaging lens unit 316a by the light collection optics 309 and any other lenses associated with the light generating element 302a.

The imaging lens unit 316a may include a single lens or it may include two or more lenses. The imaging lens unit 316a is positioned symmetrically or non-symmetrically between the light collecting unit 309 and the target area 308. The position of the imaging lens unit 316a between the light collecting unit 309 and the target area 308 is dependent on the particular optical design selected for the illumination system.

The light generating element 302a and its respective light collection unit 309 may be described as a light source unit. The light source unit, along with its respective imaging lens unit 316a may be described as forming an illumination channel. However, as explained above, each illumination channel may include other additional or alternative elements as would be suitable for a particular application.

Where the intensity profile of the light 304a at the condenser lens 312a is relatively uniform, the resulting image of the condenser lens 312a formed at the target area is also relatively uniform. For example, where the light source 302a is an LED, the near-Lambertian nature of the emitted light 304a results in relatively uniform illumination of the condenser lens 312a, and so illumination of the target area 308 by light 318a from the imaging lens unit 316a is also relatively uniform.

Other light generating elements 302b and 302c each have respective light collecting lenses 310b, 312b and 310c, 312c that direct the emitted light 304b and 304c towards the respective imaging lens units 316b and 316c. The imaging lens units 316b and 316c relay images of the output from the light collection optics, in other words images of the condenser lenses 312b and 312c, to the target area 308. The images of the condenser lenses 312a, 312b and 312c overlap at the target area 308 and substantially fill, or may even slightly overfill, the target area 308.

The light collection unit 309 and the imaging lens unit 316 may comprise lenses that are generally circular in outer shape or may have some other shape. In some exemplary embodiments, one or more of the light collecting optics 310, 312 or the lenses of the imaging lens unit 316 may be formed in a sheet, with the individual lenses in registration with the respective light sources. In such a case, the lenses may be provided with an outer shape that reduces dead space between lenses and may be, for example, a closely packed hexagonal or square array. In some exemplary embodiments, it may be advantageous for the shape of the lenses to match the shape of the light emitting areas of the light emitting elements. In many LEDs available today, the light emitting area is square or rectangular, and so it may be advantageous to used square or rectangular lenses in the lens sheet. The lenses may be formed of any suitable material, including glass or polymeric materials. The lenses may be spherical or aspherical and may be ground or molded. Polymer materials are particularly well suited to forming arrays of lenses on sheets. Lens sheets are typically formed from polymer material with either one or both surfaces molded to form areas of refractive focusing power that operate as lenses.

The relayed light 318a and 318c propagates generally along the axes 306a and 306c respectively. The axes 306a and 306c are tilted around the axis of the target area 308: in the illustrated embodiment, the axis of the target area is coincident with the axis 306b, but in other exemplary embodiments it may be different. Tilting of the axes 306a and 306c permits the relayed light 318a and 318c to fill the angular space available at the target area 308. In the exemplary embodiment illustrated in FIG. 3B, the light collection optics 312 of each channel are co-axial with the respective imaging lens unit 316 of that channel, with the result that the light propagates in each illumination channel along a single axis 306 from the light generating element 302 to the target 308. The axes 306a, 306b, 306c may be positioned to pass through the center of the target 308 and be oriented radially so as to accommodate the tangential dimensions of the optical elements associated with each illumination channel. This arrangement increases the intensity of the illumination light received at the target 308. Accordingly, the light generating element 302a, 302b 302c may be mounted to a surface of the curved base 303 that is spherical, with a radius of curvature centered approximately at the center of the target 308.

A field lens 320 may be positioned between the target 308 and the imaging lens units 316 so that the relayed light 318a and 318c stays within the acceptance cone of the illumination system 300. Alternatively, the light generating elements may be mounted individually tangentially to an imaginary surface shown as 303.

Figure 3C:
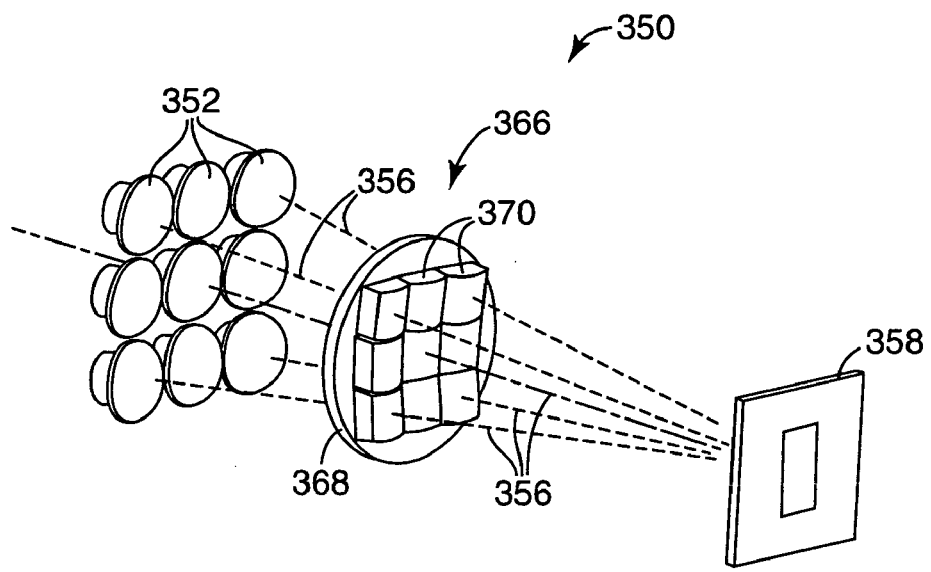
FIG. 3C schematically illustrates another exemplary embodiment of an illumination system according to principles of the present disclosure.

Another exemplary embodiment of an illumination system 350 is schematically illustrated in perspective view in FIG. 3C. In this exemplary embodiment, nine illumination channels are formed using nine light source units 352 arranged in an array. Each light source unit 352 in this particular embodiment includes an LED as a light generating element and two lenses forming a light collection unit. The light source units 352 are arranged as if mounted or disposed tangentially to a spherical surface whose radius of curvature is centered at the target area 358, so that axes 356 of each illumination channel diverge radially from the center of the target area 358. Only some of the axes 356 are shown in the drawing. Associated imaging lens units 366 are disposed between the light source units 352 and the target area 358, for imaging the lenses of the light source units 352 to proximate the target area.

Figure 3D:
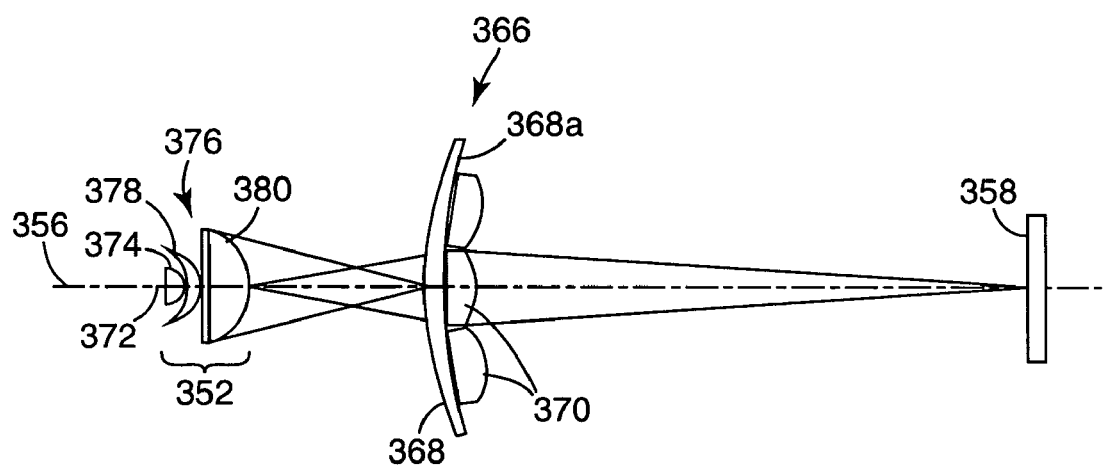
FIG. 3D schematically illustrates a partial cross-sectional view of the exemplary illumination system of FIG. 3C.

A schematic partial cross-sectional view of the illumination system 350, showing one illumination channel, is presented in FIG. 3D. In this exemplary embodiment, the light source unit 352 includes an LED 372 that is encapsulated in a resin lens 374 and a light collection unit 376 that has two lenses 378 and 380. One or more of the lenses in the collection optics 376 may be aspherical.

Also, in this exemplary embodiment, the imaging lens unit 366 includes two lenses 368, 370, which may be two different types of lenses, as is schematically shown in the partial cross-sectional view of the illumination system 350 in FIG. 3D. At least one of the lenses 368, 370 may be aspherical. In addition, one of the lenses may optionally be common to more than one of the illumination channels. In particular, in this exemplary embodiment, the lenses 370 of different illumination channels are mounted to one of the surfaces 368a of the common lens 368. The lenses 370 may be referred to as single channel lenses. More than one single channel lens 370 may be associated with each illumination channel. The surface 368a may have a radius of curvature that is approximately centered at the target area 358, so that the lenses 370 mounted to the surface 368a are suitably oriented for their respective illumination channels. The lenses 370 may be mounted individually to the surface 368a or may be formed as a single sheet that is mounted to the surface 368a.

It should be noted that, where LEDs are used in the illumination systems 300 and 350, the LEDs may all emit light of the same color or may emit light of different colors. For example, the LEDs in the illumination system 350 may all emit light in one of the primary colors, red, green or blue. In another configuration, some of the LEDs may emit light of one color while other LEDs emit light of one or more other colors. In another configuration, the LEDs may emit white light, for example through a combination of LEDs emitting red, green and blue light, or through conversion of short wavelength light through the use of a phosphor.

EXAMPLE

An example system, like that illustrated in FIGS. 3C and 3D, was numerically analyzed for performance. The nine LEDs were assumed to be green Luxeon III emitters, model no. LXHL-PM09, available from Lumileds Inc., San Jose, Calif. Each illumination channel was assumed to be formed using an LED that has an encapsulating dome lens, a light collection system formed of two lenses, and an imaging lens unit formed of two lenses. A field lens and an image-forming device were assumed to be common to all illumination channels. Parameters for each of the optical elements are shown in Table I. The parameter R corresponds to the radius of a particular surface and the parameter T is the physical distance between that surface and the following surface. The material of which the lens is formed is listed, along with the clear aperture (CA) of each lens, and the conical constant (k) for any non-spherical surface.

For example, the first lens in the light collection unit (Collection 1) is formed of S-NPH2 glass and is spaced 20 μm from the dome lens on the LED. The Collection 1 lens has a first surface, facing the dome lens, which has a radius of curvature of −6.7 mm. The Collection 1 lens has a thickness of 3 mm and has a second surface having a radius of curvature of −4.7 mm. The output side of the Collection 1 lens is disposed 20 μm from the first surface of second lens in the light collection unit (Collection 2).

TABLE I

Lens Parameters for Exemplary Embodiment

| Component | R (mm) | T (mm) | Material | CA (mm) | k |
|---|---|---|---|---|---|
| LED dome | −2.8 | 0.02 | | 5.6 | |
| Collection 1 | −6.7 | 3.00 | S-NPH2 | 8.00 | |
| Collection 1 | −4.7 | 0.02 | | 9.20 | |
| Collection 2 | 112.011 | 5.50 | Acrylic | 14.00 | |
| Collection 2 | −5.9593 | 40.00 | | 14.00 | −1.1171 |
| Imaging 1 | 90.66 | 5.00 | BK7 | 40.00 | |
| Imaging 1 | 85.66 | 0 | | 40.00 | |
| Imaging 2 | 85.66 | 5 | BK7 | 8.8 × 8.8 | |
| Imaging 2 | −18.454 | 38 | | 8.8 × 8.8 | |
| Field lens | flat | 23.36 | Acrylic | 24.00 | |
| Field lens | −34.00 | | | 24.00 | −6.0168 |
| Target | | | | 8.72 × 15.5 | |

The Collection 2 lens is formed of acrylic, and may be a molded asphere. The Collection 2 lens has an aspheric output surface. The imaging lens unit includes two lenses (Imaging 1 and Imaging 2), the first lens (Imaging 1) having a 40 mm diameter clear aperture and the second (Imaging 2) being square in shape with an 8.8 mm side. It was also assumed that a field lens, having a flat input surface and an output surface with a radius of curvature of −34 mm, was placed between the collection optics and the image-forming device at the target. Additional flat optical components, for example polarization controlling elements, may optionally be positioned between the imaging lens units and the image-forming device.

Figure 3E:
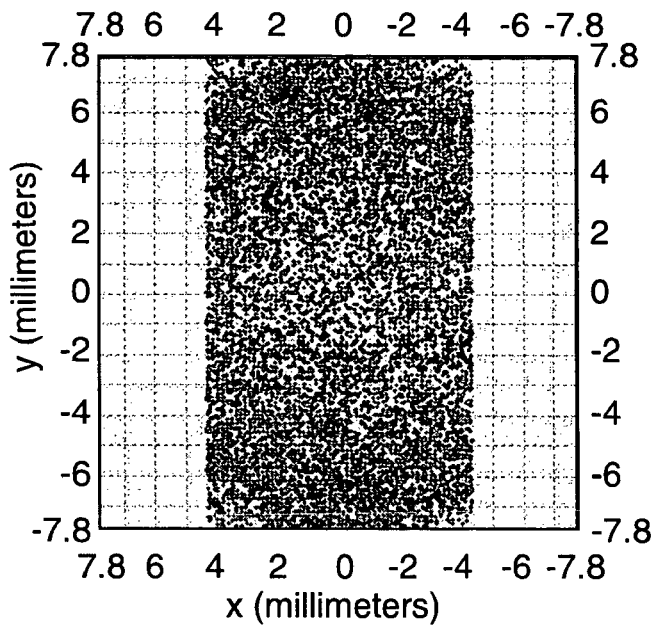
FIG. 3E shows an illuminance map of an image-forming device when illuminated by an illumination system of the type schematically illustrated in FIG. 3C.

The results of numerical modeling this illumination source show that approximately 39% of the light emitted from the LEDs is directed through the collection optics and imaging lens unit to the target plane. An illuminance map of the target LCoS image-forming device is shown in FIG. 3E. As can be seen, the image-forming device is illuminated relatively uniformly.

In some applications, it may be useful to combine the light from different arrays of LEDs. Such combination may be useful, for example, for generating a beam of mixed color light, e.g. white light. Since the bandwidth of light output from a typical currently available LED is relatively narrow compared to the bands of primary color, such combination may also be useful for combining light from LEDs within the same color band. For example, a first set of LEDs may generate light having a relatively shorter wavelength within the red color band, while a second set of LEDs generate light at a longer wavelength within the red color band. The resulting combined light beam has a greater power in the red color band than the light beams from either the first or second set of LEDs individually.

Figure 4:
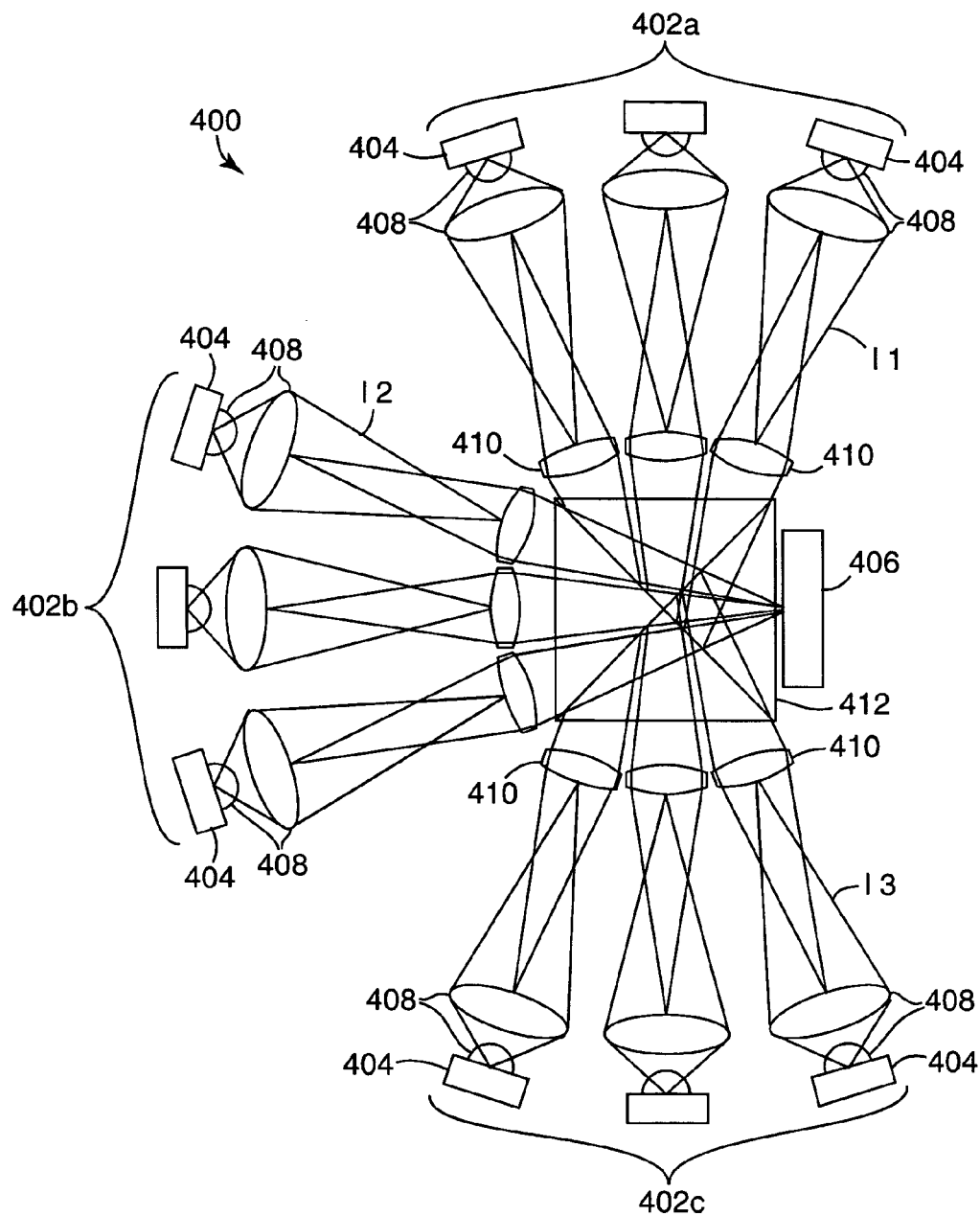
FIG. 4 schematically illustrates an exemplary embodiment of an illumination system that uses color combination according to principles of the present disclosure.

One approach to combining light from different sets of LEDs is schematically illustrated in FIG. 4, which shows an illumination source 400 including three sets 402a, 402b, 402c of LEDs 404 directing light to an image-forming device 406. It should be noted that the figure is schematic and is not drawn to scale. Each LED 404 is associated with one or more light collecting lenses 408 and an imaging lens unit 410 to image the light collecting lenses 408 to the image-forming device 406. The different sets 402 of LEDs 404 emit light at respectively different wavelengths, λ1, λ2, and λ3. The light at λ1, λ2, and λ3 is combined in a color combiner 412, for example a dichroic combiner, and is then directed to the image-forming device 406. In one exemplary embodiment, the color combiner may be an x-cube color combiner.

Figure 5:
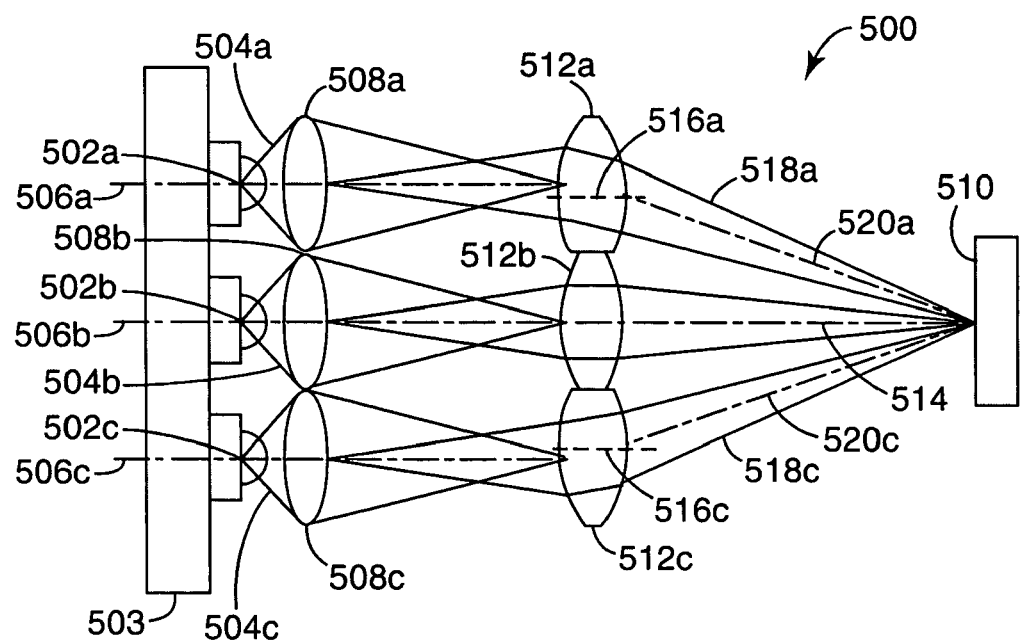
FIG. 5 schematically illustrates another exemplary embodiment of an illumination system according to principles of the present disclosure.

Another configuration of illumination source 500 is schematically illustrated in FIG. 5. The illumination source 500 includes an array of light generating elements 502a, 502b 502c, such as LEDs, mounted in a plane or substantially along the same plane. For example, the light generating elements 502a, 502b 502c may be mounted on a planar base 503.

The light generating elements 502a, 502b, 502c emit light 504a, 504b, 504c generally along their respective emission axes 506a, 506b, 506c. The emission axes 506a, 506b, 506c are parallel. In each illumination channel, the light 504a, 504b, 504c is collected by respective light collection units 508a, 508b and 508c, shown in this exemplary embodiment as condensing lenses. The collected light is directed towards respective imaging lens units 512a, 512b and 512c, shown as single lenses. The light generating elements 502a, 502b, 502c may be imaged proximate the imaging lens units 512a, 512b and 512c. The imaging lens units 512a, 512b and 512c relay respective images of the closest lens of the light collection unit 508a, 508b, 508c to proximate the target area 510. Where the illumination source 500 is used in a projection system, the target area 510 corresponds to the position of an image-forming device.

The imaging lens units 512a and 512c that lie off the target axis 514 are axially offset, that is the optical axes 516a, 516c of the imaging lens units 512a, 512c are offset from the axes 506a, 506c of the incident light 504a, 504c. Consequently, after passing through the imaging lens units 512a, 512c, the relayed light 518a, 518c propagates generally along axes 520a, 520c that are not parallel to the target axis 514. In this illustrated exemplary embodiment, the axis 506b of the center light generating element 502b coincides with the target axis 514. Advantageously, the axes 520a, 520c intersect the target axis 514 at the target area 510 so as to increase the overlap of the light from the different light generating elements 502a, 502b, 502c at the target area 510.

An increased axial offset results in the light from the imaging lens units 512 being directed through a larger angle relative to the light received from the light collecting optics 508. Thus, if a greater number of light sources 502 were to be used, the axial offset would be larger for those illumination channels distanced further from the target axis 514.

The lenses in the light collection units 508 and the imaging lens units 512 may be provided as individual lenses. However, since the lenses in this configuration are positioned in planes perpendicular to the target axis, this configuration lends itself particularly well to the use of sheets of lenses. Lens sheets are typically formed from polymer material with either one or both surfaces molded to form areas of refractive focusing power that operate as lenses.

The present disclosure should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present disclosure is directed upon review of the present specification. The claims are intended to cover such modifications and devices. For example, dimensions, configurations, types and numbers of light sources and optical elements, such as refractive or, where suitable, reflective elements, used in the embodiments of the present disclosure can vary depending on the specific application and the nature and dimensions of the illumination target. Illumination systems utilizing light sources and channels of other colors as well as different numbers of channels, as suitable for a particular application, are also within the scope of the present disclosure. The exemplary embodiments of the present disclosure may be used with a variety of light sources, such as LEDs of other colors, organic light emitting diodes (OLED), vertical cavity surface emitting lasers (VCSEL) and other types of laser diodes, phosphorescent light sources and other suitable light emitting devices.

What is claimed is:

1. An illumination unit for illuminating a target area, comprising:
    a plurality of light generating elements;
    a plurality of light collection units disposed to collect light from respective light generating elements; and
    a plurality of imaging lens units disposed to relay images of respective light collection units to proximate the target area, light from different light generating elements overlapping at the target area, wherein the light generating elements are arranged on a planar surface, wherein the illumination axis is positioned centrally with respect to the target area, and wherein the imaging lens units positioned at an increased lateral distance from the illumination axis have an increased optical axis offset with respect to the light received from the respective light collecting optical element.

2. A unit a recited in claim 1, wherein the light generating elements arc light emitting diodcs(LEDs).

3. A unit as recited in claim 1, wherein the light propagating from each of the light collection units towards its respective imaging lens unit propagates generally along a direction parallel to a single illumination axis.

4. A unit as recited in claim 1, wherein each image substantially illuminates the entire target area.

5. A unit as recited in claim 1, wherein an image-forming device is positioned at the target area.

6. A unit as recited in claim 5, further comprising a field lens disposed between the image-forming device and the plurality of imaging lens units.

7. A unit as recited in claim 5, wherein the image-forming device comprises one of a liquid crystal image-forming device and an array of individually rotatable mirrors.

8. A unit as recited in claim 5, further comprising a control unit coupled to the image-forming device to control an image formed by the image-forming device and a projection lens unit disposed to project image light received from the image-forming device.

9. A unit as recited in claim 1, wherein the plurality of imaging lens units comprises a plurality of lenses, light from each light source being imaged by at least one respective lens of the plurality of lenses.

10. A unit as recited in claim 9, wherein the lenses have substantially the same focal length.

11. A unit as recited in claim 1, wherein the plurality of light collection units comprises arrangements of at least one lens associated with each light generating clement.

12. A unit as recited in claim 1, wherein the light generating elements emit light of the same color.

13. A unit as recited in claim 1, wherein at least one of the light generating elements emits light of a color different from other light generating elements.

* * * * *

UNITED STATES PATENT AND TRADEMARK OFFICE
CERTIFICATE OF CORRECTION

PATENT NO.           : 7,390,097 B2                                           Page 1 of 1
APPLICATION NO. : 10/923945
DATED                  : June 24, 2008
INVENTOR(S)         : Simon Magarill It is certified that error appears in the above-identified patent and that said Letters Patent is hereby corrected as shown below:

Column 3
Line 34, Delete "(LCOS)" and insert -- (LCoS) --, therefor.

Column 5
Line 66, Delete "309 '" and insert -- 309' --, therefor.

Column 6
Line 12, Delete "304 b," and insert -- 304b, --, therefor.

Column 7
Line 8, Delete "318 a" and insert -- 318a --, therefor.
Line 11, Delete "3 12b" and insert -- 312b --, therefor.
Line 11, Delete "3 12c" and insert -- 312c --, therefor.

Column 11
Line 36, In Claim 2, Delete "arc" and insert -- are --, therefor.
Line 36, In Claim 2, Delete "diodcs" and insert -- diodes --, therefor.

Column 12
Line 29, In Claim 11, Delete "clement." and insert -- element. --, therefor.

Signed and Sealed this

Second Day of December, 2008

JON W. DUDAS
*Director of the United States Patent and Trademark Office*